United States Patent Office 3,595,959
Patented July 27, 1971

3,595,959
METHOD OF COMBATTING FUNGI AND BACTERIA USING 2,3-DIHYDRO-1,3-BENZOXAZINE-4H-2-THIONE - 4 - ONE AND DERIVATIVES OF DIHYDRO-1,3-BENZOXAZINE-2-THIONE-4-ONE
Teruhisa Noguchi, Fujisawa-shi, Keisuke Komoto, Hiratsuka-shi, Sho Hashimoto, Kahoku-gun, Koshin Miyazaki, Takaoka-shi, and Koishi Hashimoto, Kahoku-gun, Japan, assignors to Nippon Soda Kabushiki Kaisha, Tokyo-to, Japan
No Drawing. Original application Apr. 10, 1967, Ser. No. 629,415. Divided and this application Nov. 20, 1968, Ser. No. 798,526
Claims priority, application Japan, Apr. 14, 1966, 41/23,249; Apr. 30, 1966, 41/27,244
Int. Cl. A01n 9/00, 9/22
U.S. Cl. 424—248   5 Claims

ABSTRACT OF THE DISCLOSURE

Dihydro-1,3-benzoxazine-2-thione-4 one or derivatives thereof which have one to three substituents on the benzene ring, have fungicidal and bactericidal activities against microbes which cause plant diseases such as melanose and scab of citrus plants, anthracnose of cucumber plants and leaf mold of tomato plants. The compounds having substituent or substituents are novel compounds. This invention relates to derivatives of dihydro-1,3-benzoxazine-2-thione-4 one or derivatives thereof having certain substituents and to a novel agricultural and horticultural fungicidal and bactericidal use of these compounds and of a known analogous compound not having any substituent.

The novel compounds provided by this invention are the compounds of the formula

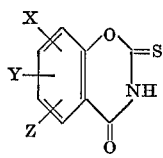

wherein X, Y, and Z each represent a member selected from a group consisting of hydrogen, halogen, nitro and alkyl having at most six carbon atoms respectively but all of them are not hydrogen simultaneously; and are prepared by the reaction of the following equation

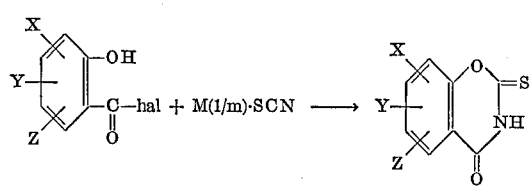

wherein hal is halogen atom, M represents alkali or heavy metal or ammonium and $m$ is valence of M.

This is a division of Ser. No. 629,415, filed Apr. 10, 1967, now abandoned.

The reaction is carried out smoothly in an inert organic solvent, such as benzene, toluene, xylene, acetone, methylethylketone, tetrahydrofuran and dioxane, at a temperature of 50–140° C. in a period of about ten minutes to three hours.

After the reaction, the reaction mixture is cooled and the precipitated material is separated from the solution by filtration. The prepared compound is obtained by extraction of the precipitate with hot organic solvent or by washing of the precipitate with water to remove by-produced inorganic salt. The compounds of this invention are usually of light yellow color and hardly soluble in water and cold organic solvent and have a high melting (or decomposition) point.

Examples of the compounds of this invention are listed in Table I below. These examples are intended to illustrate but not to limit the invention.

The biological properties of the aforesaid novel compounds were investigated together with other, analogous compounds. Consequently, it was discovered that these novel compounds and a known compound, 2,3-dihydro-1,3-benzoxazine 4H-2-thione-4-one

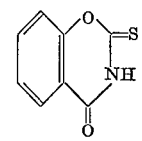

(compound IX)

which is reported by T. Ugai et al. (Journal of Pharmaceutical Society of Japan; Yakugaku Zasshi, vol. 55, pp. 8–12, have superior fungicidal and bactericidal activity against various microbes causing disease in plants, and low toxicity for warm blooded animal (acute oral toxicity for mouse $LD_{50}$ 200–300 mg.) and cultivated plant and fruits.

In this invention, usually a small but effective amount of the compounds are applied to plant surfaces by spraying and on or into soil around the root system of plants by drenching to protect the plant by controlling the microbes and diseases.

The concentrations of the active ingredients of the compounds in the fungicidal or bactericidal compositions of this invention are varied according to type of formulation, and they are, for example, in a range of 10–70 percent, more preferably 20–60 percent, in wettable powders, 0.5–10 percent, more preferably 1–5 percent, in dust formulations and 10–70 percent, more preferably 10–50 percent, in emulsifiable concentrates. In the above formulations of the composition, auxiliary agents or materials, for example, inert mineral powders such as clays, talc and diatomaceous earth, dispersing agents such as sodium ligninsulfonate, casein and wetting agents such as alkylarylsulfonate and polyoxyethylene alkylphenol, are employed selectively according to the type of formulation for increasing plant disease control rate. Furthermore, the composition may be applied as a mixture with other fungicides, insecticides, acaricides, plant growth regulators and fertilizers.

Illustrative but non-limiting examples of the preparation of the novel compounds and the fungicidal composi-

TABLE I

| Number of compound | Structural formula | Color | Form of crystal | Solvent for recrystallization | Melting point or decomposition point (d) (° C.) | Molecular formula | Analysis (percent) for— | | | |
|---|---|---|---|---|---|---|---|---|---|---|
| | | | | | | | C | H | N | Halogen |
| I | (6-methyl benzo-oxathiazinone) | Light yellow | Prisms | Acetic acid | 232–233 | C₉H₇NO₂S | 55.75(55.96) | 3.82(3.62) | 7.27(7.25) | |
| II | (6-Cl) | do | Needles | do | 236–237 | C₈H₄ClNO₂S | 44.85(44.96) | 1.93(1.87) | 6.31(6.56) | 16.27(16.61) |
| III | (6-Br) | do | do | Dioxane-pet. ether | 250–251 | C₈H₄BrNO₂S | 37.40(37.20) | 1.55(1.49) | 5.74(5.43) | |
| IV | (6,8-Cl₂) | do | Prisms | Dioxane-ethylacetate | 241–242 | C₈H₃Cl₂NO₂S | 39-15(38.71) | 1.20(1.11) | 5.83(5.65) | 30.55(31.00) |
| V | (6,8-Br₂) | do | do | Ethylacetate | 258–259 | C₈H₃Br₂NO₂S | 28.82(28.50) | 1.01(0.89) | 4.22(4.15) | |
| VI | (8-NO₂) | do | Plates | Acetone-ethanol | 239–240(d) | C₈H₄N₂O₄S | 42-75(42.86) | 1.91(1.79) | 12.67(12.50) | |

TABLE I—Continued

| Number of compound | Structural formula | Color | Form of crystal | Solvent for recrystallization | Melting point or decomposition point (d) (° C.) | Molecular formula | Analysis (percent) for— | | | |
|---|---|---|---|---|---|---|---|---|---|---|
| | | | | | | | C | H | N | Halogen |
| VII | (NO₂ structure) | ---do--- | Needles | Dioxane-ethanol | 260(d) | Same | 42.70(42.86) | 2.04(1.79) | 12.50(12.50) | |
| VIII | (Br structure) | ---do--- | ---do--- | Dioxane | 258-260(d) | C₈H₅Br₃NO₂S | 24.00(23.08) | 0.95(0.48) | | 3.53(3.37) | tions and fungicidal and bactericidal tests of the active ingredient of the compositions are as follows:

EXAMPLE 1

6-nitro-dihydro-1,3-benzoxazine-2-thione-4-one (Compound VI)

A mixture of 12.5 g. of 5-bromosalicyloyl chloride and 8.6 g. of lead thiocyanate in 35 ml. of anhydrous toluene was heated and kept at a temperature of 90–100° C. for one hour under agitation. Then, the reaction mixture was cooled and filtered to remove toluene solution. The separated precipitate was extracted three times, each time with 30 ml. of hot dioxane. The extract was cooled with ice water and 100 ml. of petroleum ether was added thereto and the thus diluted extract was allowed to stand whereupon light yellow needles precipitated therefrom. 8.8 g. of crystals, M.P. 250–251° C., were obtained. Crystals of higher melting point were not produced by recrystallization from dioxane-petroleum ether solution.

EXAMPLE 2

6,8-dichloro-dihydro-1,3-benzoxazine-2-thione-4-one (Compound IV)

A mixture of 22.6 g. of 3,5-dichlorosalicyloyl chloride and 17.0 g. of lead thiocyanate in 60 ml. of anhydrous xylene was heated and kept at a temperature of 110–120° C. for one hour and a half under agitation. 15.0 g. of light yellow prisms, M.P. 240–241° C., were obtained by a similar treatment to Example 1. Crystals of melting point 241–242° C. were obtained by recrystallization from a dioxane-ethyl acetate solution.

EXAMPLE 3

8-nitro-dihydro-1,3-benzoxazine-2-thione-4-one

A solution of 37 g. of 3-nitrosalicyloyl chloride in 100 ml. of acetone was added to a mixture of 15.5 g. of ammonium thiocyanate in 50 ml. of acetone at a temperature of 10–20° C. The mixture was heated on a steam bath for ten minutes under reflux. Then acetone was distilled off from the mixture, and the residue was washed with water to remove ammonium chloride and further washed with 50 ml. of hot ethanol and dried. The material yielded (20 g.) having M.P. 238–239° C. (decomposition) was recrystallized from an acetone-ethanol solution to obtain light yellow plates, M.P. 239–240° C. (decomposition).

EXAMPLE 4

Wettable powder

| | Parts by weight |
|---|---|
| Compound IV | 50 |
| Sodium alkylsulfonate | 5 |
| Diatomaceous earth | 45 |

These were mixed and micronized in a Jet pulverizer to particle size of 10–20 microns. In practical use, the micronized mixture was diluted with water to a concentration of 0.01 to 0.05% of active ingredient. The suspension was applied as a spray or a drench.

EXAMPLE 5

Emulsifiable concentrate

| | Parts by weight |
|---|---|
| Compound VI | 20 |
| Xylene | 72 |
| Cyclohexanone | 20 |
| Phenyl polyoxyethylene | 8 |

These were mixed and dissolved. In practical use, the solution was diluted with water to a concentration of 0.01 to 0.05% of active ingredient and the resultant suspension was sprayed or drenched.

EXAMPLE 6

Dust formulation

|  | Parts by weight |
|---|---|
| Compound IX | 2 |
| Talc | 98 |

These were mixed and crushed to form a fine powder. The dust formulation was applied by dusting at a rate of 3 to 5 kg. per 10 acres. In Examples 4–6, the naming of specific emulsifying, wetting or dispersing agents, carriers and solvents are not intended as limitations.

Test 1.—In vitro test

Antimicrobial activities of the compounds were estimated by the agar-diffusion method. Paper disks of 8 mm. diameter were dipped in a 1% solution of each compound. Each disk was placed on a nutrient agar previously seeded with test microbes in petri dishes. After incubation at 28° C. for 2 days in the case of bacteria and 4 days in the case of fungi, the inhibitory zone in each petri dish was estimated as shown in Table II.

TABLE II

| Test microbes | Compound No. | | | | | | | | |
|---|---|---|---|---|---|---|---|---|---|
|  | I | II | III | IV | V | VI | VII | VIII | IX |
| Alternaria mali | 12 | 20 | 15 | 10 | 10 | 10 | 9 | 20 | 20 |
| Cladosporium fulvum | 20 | 45 | 40 | 20 | 30 | 12 | 12 | 25 | 30 |
| Colletotrichum lagenarium | 15 | 30 | 20 | 10 | 15 | 9 | 9 | 15 | 20 |
| Piricularia oryzae | 20 | 25 | 15 | 12 | 15 | + | + | 10 | 20 |
| Xanthomonas citri | 10 | 15 | 10 | 9 | + | 12 | 15 | 12 | 20 |
| Xanthomonas oryzae | 11 | 15 | 10 | 10 | + | 15 | 15 | 12 | 20 |

NOTE.—The figures on the table are diameters of inhibitory zone. The mark (+) shows the inhibition of growth under the disk.

Test 2.—Foliar spray tests (1) Wettable powders including various active ingredients were made up according to Example 4. They were diluted in given concentrations and sprayed on cucumber plants. Two days after spraying, they were inoculated with the dondida of the fungus, Colletotrichum lagenarium. The plants were then returned to a greenhouse until disease lesions were clearly visible.

The results are shown in Table III.

TABLE III

| Compound Number: | Conc. of active ingredient (γ/ml.) | No. of lesion per leaf | No. of value, percent | Plant injury |
|---|---|---|---|---|
| III | 1,000 | 0 | 100 | None. |
|  | 300 | 3.7 | 98.4 |  |
| IV | 1,000 | 0 | 100 | Do. |
|  | 300 | 1.2 | 99.5 |  |
| IX | 1,000 | 0 | 100 | Do. |
|  | 300 | 1.3 | 99.4 |  |
| 2.4-dichloro-6-(2'-chloro anirino)-3-triazone¹ | 1,000 | 1.2 | 99.5 | Do. |
|  | 300 | 32.8 | 86.2 |  |

¹ Prior art fungicides.

(2) Emulsifiable concentrates including various active ingredients were made up according to Example 5. They were diluted to a given concentration and sprayed on the tomato plants growing in a greenhouse and infected by the fungus, Cladosporum fulyum. No artificial inoculations were made as nature infection was adequate.

After a week, the same spraying was repeated. Two weeks after the second spraying, investigation of the results was carried out. The results are shown in Table IV.

TABLE IV

| Compound Number: | Conc. of active ingredient (γ/ml.) | No. of investigated leaves | Percent of diseased leaves | Control value, percent |
|---|---|---|---|---|
| I | 1,000 | 103.7 | 2.7 | 96 |
| VII | 1,000 | 104.7 | 3.0 | 95 |
| $\begin{array}{c}\text{CH}^2-\text{NH}-\overset{\overset{\text{S}}{\|}}{\text{C}}-\text{S}\\ \text{CH}^2-\text{NH}-\underset{\underset{\text{S}}{\|}}{\text{C}}-\text{S}\end{array}\Big\rangle\text{Zn}$ | 1,630 | 83.7 | 19.1 | 69 |
| Check | | 95.0 | 60.7 | 0 |

NOTE.—The compound shown by formula is a known fungicide sold under the tradename "Zineb."

Test 3.—Spray tests for fruits

Wettable powders separately including the Compounds II, IV, V, VIII and IX were made up according to Example 4. They were diluted to a concentration of 1000 γ/ml. active ingredient and sprayed on citrus plants growing in the field. The spraying was repeated four times at the interval of a week. When the check cirtus fruits were heavily infected by melanose (Diaporthe citri) and scab (Elsione fawcetti), all the fruits in the test plots were harvested and investigated. The application of every compound gave control against the above two disease as shown in the Table V.

TABLE V

| Compound No. | Control value, percent | |
|---|---|---|
|  | Melanoes | Scab |
| II | 80.6 | 85.2 |
| IV | 97.7 | 98.5 |
| V | 86.2 | 88.1 |
| VIII | 90.0 | 87.5 |
| IX | 91.3 | 89.6 |

What we claim is:

1. A method of combating fungi and bacteria which comprises applying to plants or cultivated soil a fungicidally and bactericidally effective amount of a compound of the formula

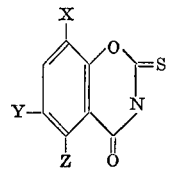

wherein X, Y and Z each is a member selected from the group consisting of hydrogen, chlorine, bromine, nitro and methyl.

2. A method according to claim 1, wherein the compound is of the formula

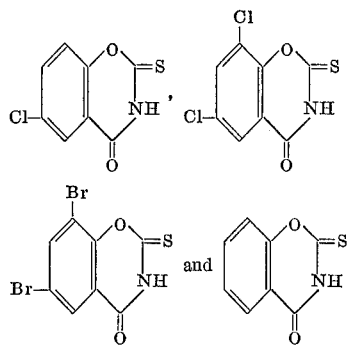

3. A method according to claim 1, wherein the compound is of the formula

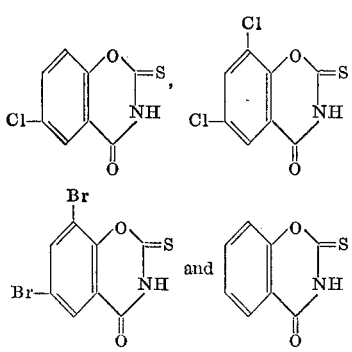

4. A method according to claim 1, wherein the compound is of the formula

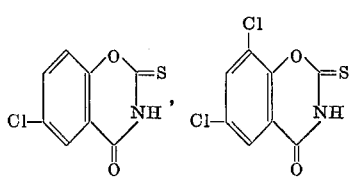

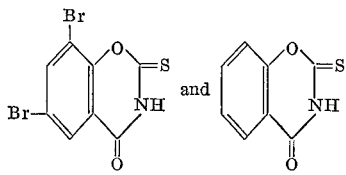

5. A method according to claim 1, wherein the compound is of the formula

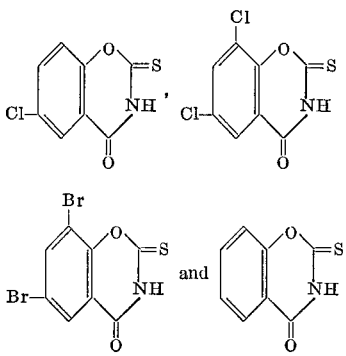

References Cited

UNITED STATES PATENTS 2,835,668   5/1958   Shapiro et al. _____ 260—244

OTHER REFERENCES

Ugai et al., Chem. Abst. vol. 29, col. 3342 (1935).
Wagner et al., Chem. Abst. vol. 63 col. 9937 (1965).
Farbenfabriken Bayer, Chem. Abst. vol. 64 col. 3564–5 (1966, 1/31/66).
Netherlands application 6412966, 5/1965, pp. 1–7, 16–18, 32, 33 and the 4th page of the drawing. (FIGS. 46–50).

ALBERT T. MEYERS, Primary Examiner

A. J. ROBINSON, Assistant Examiner

U.S. Cl. X.R.

260—244R

UNITED STATES PATENT OFFICE
CERTIFICATE OF CORRECTION

Patent No. 3,595,959          Dated July 27, 1971

Inventor(s) NOGUCHI ET AL

It is certified that error appears in the above-identified patent and that said Letters Patent are hereby corrected as shown below:

Column 8, line 70 in the formula please correct "N" to -- NH --

Signed and sealed this 28th day of December 1971.

(SEAL)
Attest:

EDWARD M. FLETCHER, JR.            ROBERT GOTTSCHALK
Attesting Officer                  Acting Commissioner of Patents